United States Patent Office 3,453,475
Patented July 1, 1969

3,453,475
NONCONTACT CURRENT-SENSING DEVICE EMPLOYING A VACUUM TUBE SURROUNDING THE CURRENT CARRYING CONDUCTOR
Evgeny Borisovich Isserlin and Jury Alexandrovich Bystrov, Leningrad, U.S.S.R.
Filed Mar. 6, 1967, Ser. No. 620,740
Int. Cl. H01j 1/50, 3/32
U.S. Cl. 313—162
8 Claims

ABSTRACT OF THE DISCLOSURE

A device for measuring current in an electrical conductor that comprises an evacuated annular enclosure in which anodes and a cathode are positioned so that the magnetic field developed by the current in the conductor will deflect the current so that the current flowing between the cathode and the anodes will be unbalanced, the degree of unbalance giving the measurement of the current in the conductor. The emissive coating on the cathode may be of different patterns to modify the change of balance per unit over the range of current in the conductor. The annular enclosure may be made of a plurality of segments.

---

The present invention relates to electrical devices for measuring currents in circuits having no direct coupling, for example, in D.C. power transmission lines where the circuit to be measured is under high potential, or in electrometallurgy and electric welding where it is impossible to use shunts which are grounded through the junction point, or in vacuum tubes (magnetron, klystron, etc.) with grounded anodes in which the shunts cannot be employed. More specifically this invention relates to noncontact current-sensing devices.

There are known current-sensing devices such as diodes which are mounted in the vicinity of a current-carrying conductor and whose operation is based on the interaction between the magnetic field of the current being measured and an electron flow. However, these devices feature two essential disadvantages which practically make their application impossible. In the first place, the output voltage of the sensing device depends both upon its space orientation and upon the distance between the device and the current-carrying conductor. Next, the readings of such current-sensing devices are adversely affected by external magnetic fields.

Other forms of noncontact current-sensing devices are also known, such as instrument transformers, whose operation is based on the induction method. However, the transformers are unfit for measurement of direct currents and offer a comparatively narrow frequency passband which causes intolerable errors when measuring pulse currents.

Further, there are known noncontact semiconductor E.M.F. transducers or Hall generators whose limitations consist in low sensitivity and in unstable output voltage which depends on an ambient temperature.

It is an object of the present invention to eliminate the above mentioned disadvantages.

It is another object of the invention to provide a noncontact current sensor whose output voltage does not depend both upon the space orientation relative to the conductor carrying the current being measured and upon external magnetic fields.

With these and other objects in view the invention consists in a noncontact current sensor whose operation is based on the interaction between the magnetic field of the current being measured and the electron flow, the electrodes of said sensor being placed in an evacuated vessel, said electrodes and vessel enveloping or encircling the conductor carrying the current being measured.

It is preferred to utilize a ring-shaped evacuated vessel whose opening is used for passing the conductor carrying the current to be measured.

The electrodes may be formed as cylinders arranged coaxially, one in the other. They may also be made in the form of rings arranged in parallel relationship to each other in planes perpendicular to the axis of the evacuated vessel.

In one of the possible embodiments of the invention the emitting surface of the cathode has sections of such configuration that the output voltage of the sensor offers the quadratic, logarithmic or exponential dependence on the current being measured.

Another modification of the device, which is convenient in operation, has an evacuated vessel divided into separate vacuum chambers each of which houses electrodes which are electrically interconnected.

The invention will be made clear from the description of several embodiments with reference to the accompanying drawings, in which.

Figure 1:
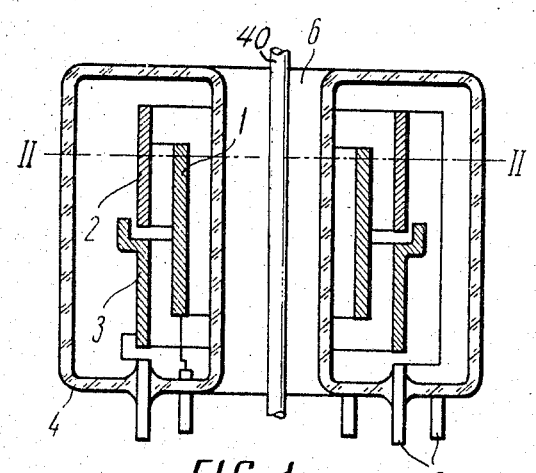
FIG. 1 is a diagrammatic representation of one embodiment of the noncontact current sensor with cylindrical electrodes according to the present invention.

The noncontact current sensor comprises a cathode 1 (FIGS. 1, 2) formed as a cylinder, and two cylindrical anodes 2 and 3 encircling the cathode. The anodes 2, 3 and cathode 1 form a coaxial system placed into an evacuated vessel 4. The electrode terminals 5 are led through the face of the vessel 4.

When applying voltage onto the electrodes, electrons flow in the radial direction from the cathode 1 to the anodes 2, 3. Now, if a current-carrying conductor 40 is passed through an opening 6 of the sensor, the vector of the intensity of the magnetic field, created by the current flowing through the conductor, will be perpendicular to the electron flow. The electrons will move in the intersected electric and magnetic fields in which case an additional force will appear which deflects the electron flow. As a result, the current in the circuit of one anode will increase and the current in the circuit of the other anode will fall.

Where the current-carrying conductor and the sensor electrodes are not coaxial, certain sections of the cathode appear to be closer to the current-carrying conductor than those which are diametrically opposite. The electrons emitted by the cathode sections adjacent the current-carrying conductor will be deflected more than those emitted by the opposite sections. As follows from the full current law, the total effect of the unbalance will be the same as in case of the coaxial arrangement of the sensor and the conductor. Thus, the output voltage does not depend upon the relative position of the sensor and the conductor.

The described sensor is almost insensitive to external magnetic fields.

Figure 3:
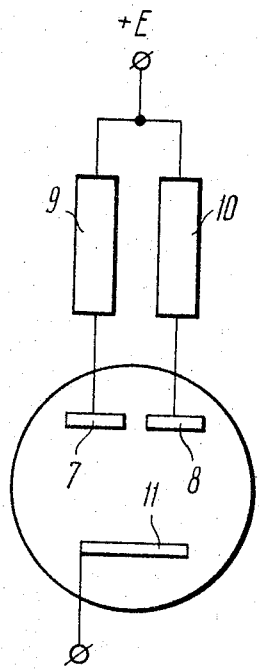
FIG. 3 is an equivalent circuit diagram of the noncontact current sensor.

This is accounted for by the fact that any external magnetic field, i.e. the field which is not caused by the current passing through the central opening of the sensor, deflects the electrons emitted from the diametrically opposite surfaces of the cathode in different directions, thus compensating possible fluctuations of the output voltage. As may be seen from the equivalent circuit diagram of the noncontact sensor (FIG. 3), the anodes are connected in series to resistors 9, 10 which, together with the sensor, form a bridge. The anode voltage E is applied across the bridge between the junction of the resistors 9, 10 and the sensor cathode 11. Redistribution of the electron flow between the anodes 7 and 8 under the action of the magnetic field created by the current being measured results in a potential difference characteristic of the magnitude of said current.

Due to such a design the closed magnetic lines of force within the sensor intersect the electron flow throughout their length.

Figure 4:
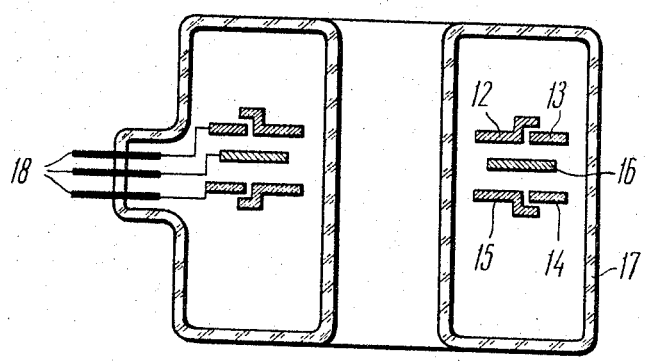
FIG. 4 is a diagrammatic representation of the noncontact current sensor with ring-shape electrodes.

FIG. 4 shows a modification of the sensor in which anodes 12, 13, 14, 15 and a cathode 16 are formed as flat rings. Here again all the electrodes are placed in an evacuated vessel 17 perpendicular to its axis and terminals 18 of the sensor are led through the side wall of said vessel. In this current-sensing device the electron flow is directed along the axis. The magnetic field of the current under measurement deflects the electron flow either toward the conductor or away from it, depending on the direction of the current.

Figure 2:
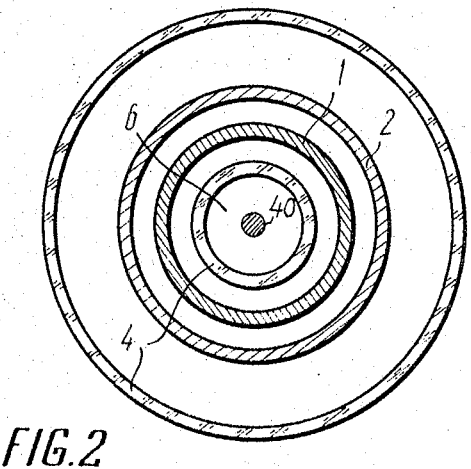
FIG. 2 is a cross section on line II—II of FIG. 1.

In this case the electrodes have no screening effect as compared with the version shown in FIGS. 1 and 2 and, moreover, since anode 12 is connected to anode 14 and anode 13 is connected to anode 15, the influence of external electric fields is also markedly minimized. Emission coating 19 of cathode 20 (FIG. 5) consists of sections whose configuration is such that the output voltage of the sensor features quadratic dependence on the current being measured. In this case the effective length of the cathode 20 increases as the current under measurement is increased, and hence, the sensor becomes more sensitive.

In another version emission coating 21 (FIG. 6) consists of sections whose configuration is such that the output voltage of the sensor features the logarithmic dependence on the current being measured. In this case the effective length of cathode 22 decreases as the current under measurement is increased so that the sensitivity of the sensor falls as the current is increased.

Emission coating 23 (FIG. 7) of a cathode 24 consists of sections whose configuration is such that the output voltage of the sensor features the exponential dependence on the current being measured. In this case current under measurement is increased. As compared to the version shown in FIG. 5, here the configuration of the sections of the coating is characterized by more pronounced inhomogeneity.

Figure 5:
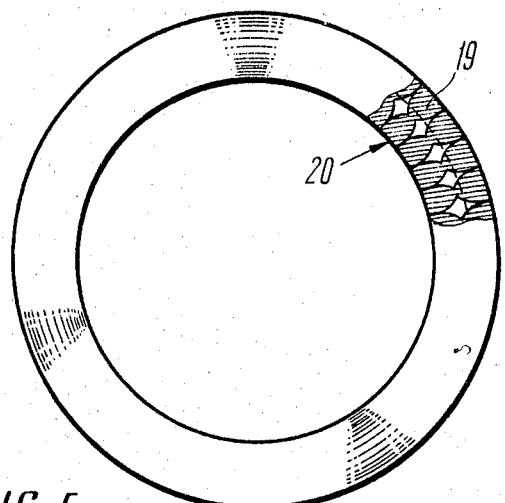
FIG. 5 is a diagrammatic view of the cathode whose emission coating has sections of such configuration that the output voltage of the sensor features the quadratic dependence on the current being measured.
Figure 6:
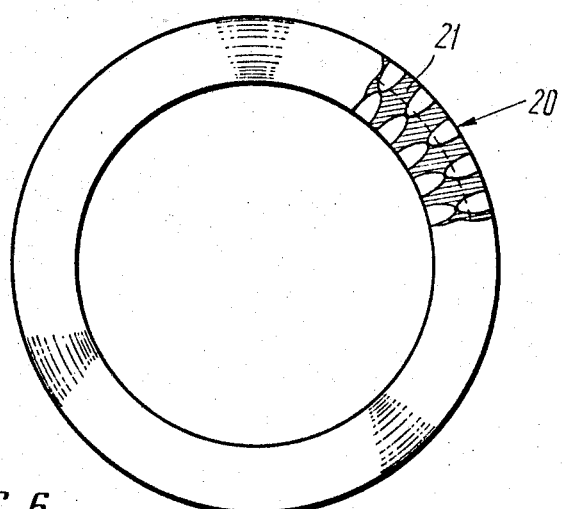
FIG. 6 is a dagrammatic view of the cathode whose emission coating has sections of such configuration that the output voltage of the sensor features the logarithmic dependence upon the current being measured.
Figure 7:
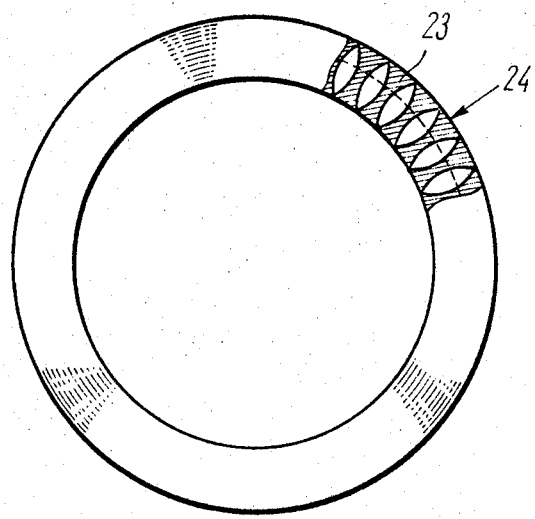
FIG. 7 is a diagrammatic representation of the cathode whose emission coating has sections of such configuration that the output voltage of the sensor features the exponential dependence on the current being measured.
Figure 8:
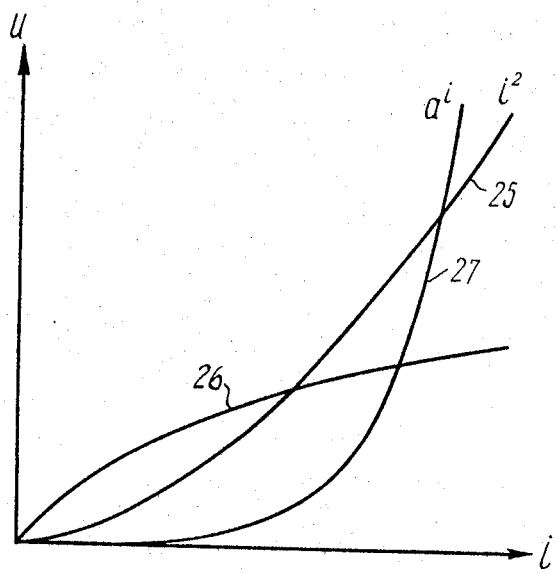
FIG. 8 shows the graphs of the above mentioned nonlinear relationship of the output voltage and the current being measured.

Curves 25, 26, 27 (FIG. 8) show the quadratic, logarithmic and exponential functions of the output voltage of the sensor having the emission coatings shown respectively in FIGS. 5, 6 and 7.

Figure 9:
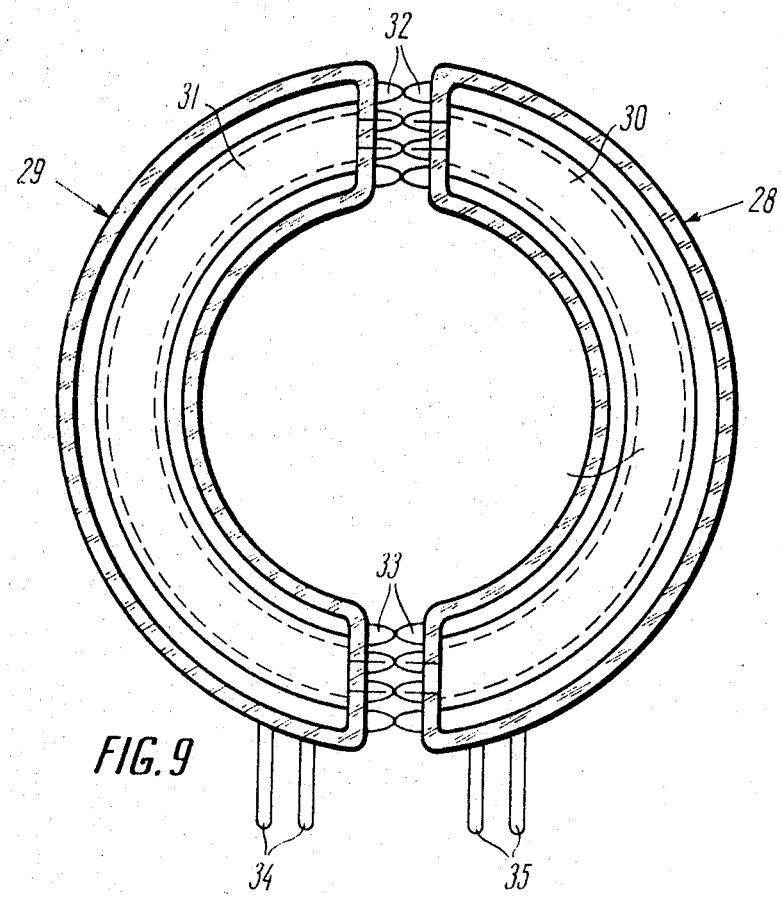
FIG. 9 is a diagrammatic representation of the divided noncontact current sensor.

The current-sensing device shown in FIG. 9 has a vessel which consists of two vacuum chambers 28, 29 accommodating electrodes 30, 31 which are two semi-rings. Both parts 28 and 29 of the vessel and 30, 31 of the electrodes are coupled by contacts 32 and 33. The connection of the sensor is effected through terminals 34 and 35. The central through opening 36 is used for passing the current-carrying conductor. Such a sensor may be replaced without breaking the current circuit. When coupled together, the two semi-rings form a single system operating as described above.

Figure 10:
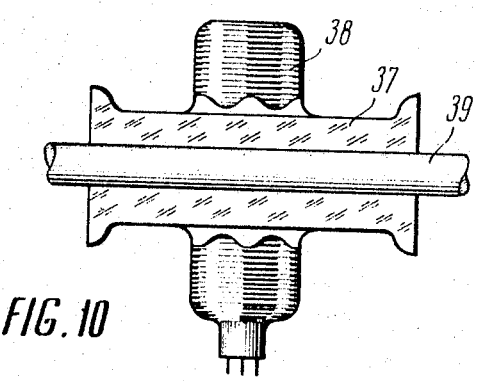
FIG. 10 shows a modification of the sensor with a built-in current-carrying conductor.

Insulator 37 (FIG. 10) and vessel 38 with the electrodes (not shown) and the current-carrying conductor 39 form a single system representing one of the embodiments of the sensor. The operation of this sensor is similar to that of the current-sensing devices described above.

The difference consists in that the insulator 37 and a part of current-carrying conductor 39 are combined with the vessel so that, in a number of cases, it is possible to provide high-tension insulation of the current-carrying conductor.

We claim:

1. A noncontact current-sensing device whose operation is based on the interaction between the magnetic field of the current being measured and an electron flow, comprising an annular evacuated vessel, electrodes placed in said evacuated vessel, said evacuated vessel and said electrodes encircling the conductor carrying the current being measured.

2. A noncontact current-sensing device whose operation is based on the interaction between the magnetic field of the current being measured and an electron flow, comprising a ring-shaped evacuated vessel, the central opening of said ring being used for passing the conductor carrying the current to be measured, electrodes including at least one cathode and two anodes enclosed in said ring-shaped evacuated vessel and encircling said conductor carrying the current to be measured.

3. A noncontact current-sensing device according to claim 2, wherein the electrodes are formed as cylinders disposed coaxially, one within the other.

4. A noncontact current-sensing device according to claim 2, wherein the electrodes are formed as flat rings disposed in parallel planes perpendicular to the axis of the evacuated vessel.

5. A noncontact current-sensing device according to claim 2, in which said cathode includes an emission coating and wherein the emission coating of the cathode is made of sections whose configuration is such that the output voltage of the current-sensing device features quadratic dependence on the current being measured.

6. A noncontact current-sensing device according to claim 2, in which said cathode includes an emission coating and wherein the emission coating of the cathode is made of sections whose configuration is such that the output voltage of the current-sensing device features logarithmic dependence on the current being measured.

7. A noncontact current-sensing device according to claim 2, in which said cathode includes an emission coating and wherein the emission coating of the cathode is made of sections whose configuration is such that the output voltage of the current-sensing device features exponential dependence on the current being measured.

8. A noncontact current-sensing device according to claim 1, wherein the evacuated vessel is divided into separate arcuate vacuum chambers each of which acsaid arcuate vacuum chambers being electrically interconnected with corresponding electrodes of the adjacent vacuum chambers.

References Cited

UNITED STATES PATENTS

| | | | |
|---|---|---|---|
| 1,015,192 | 1/1912 | Knopp | 324—98 |
| 1,582,270 | 4/1926 | Snook et al. | 313—160 X |
| 2,528,437 | 10/1950 | Joy | 313—162 X |
| 3,199,026 | 8/1965 | Liebwitz | 324—127 |
| 3,365,665 | 1/1968 | Hood | 324—117 |

JAMES W. LAWRENCE, *Primary Examiner.*

C. R. CAMPBELL, *Assistant Examiner.*

U.S. Cl. X.R.

313—306; 315—344; 317—51; 324—117, 122, 127